Apr. 10, 1923.
G. FORTON
HANDSAW
Filed Aug. 24, 1922
1,451,211
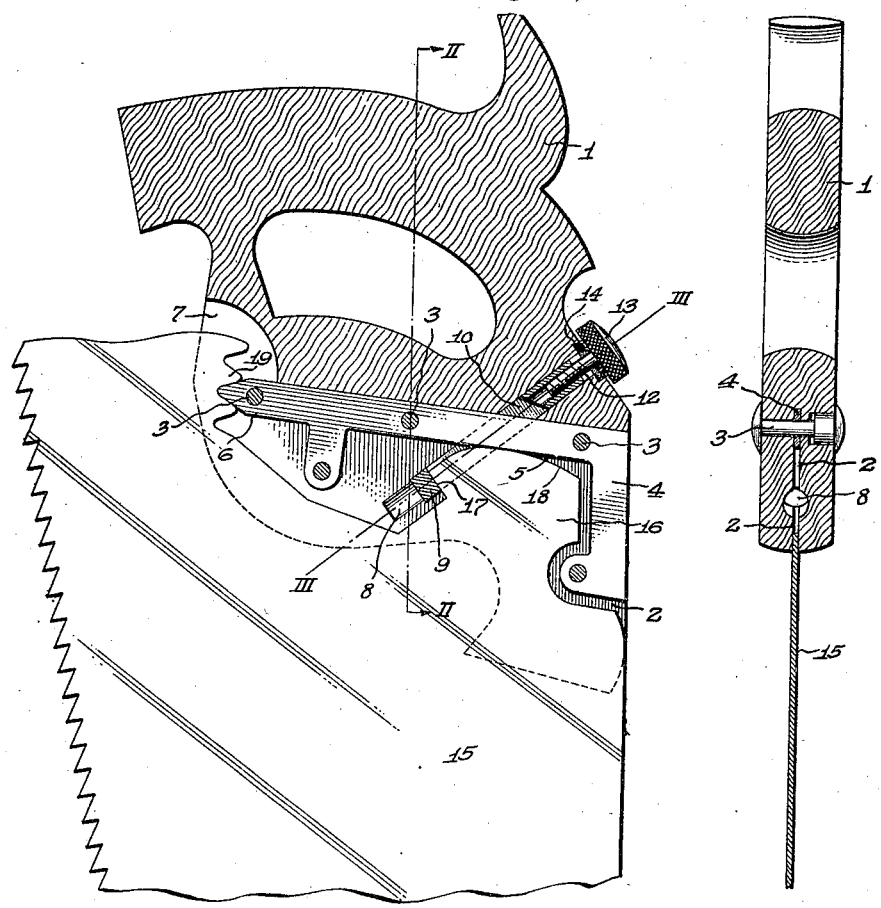
Fig. 1.   Fig. 2.
Fig. 3.
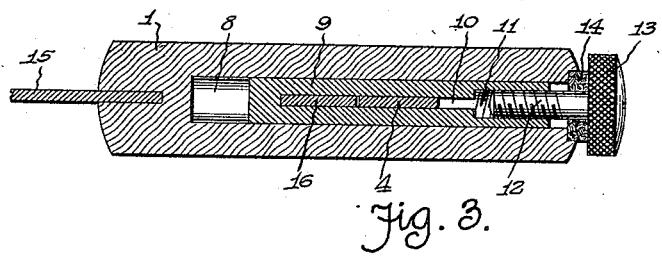
Inventor
George Forton,
By
Attorneys Patented Apr. 10, 1923.

1,451,211

UNITED STATES PATENT OFFICE.

GEORGE FORTON, OF DETROIT, MICHIGAN.

HANDSAW.

Application filed August 24, 1922. Serial No. 583,957.

*To all whom it may concern:*

Be it known that I, GEORGE FORTON, a citizen of the United States of America, residing at Detroit, in the county of Wayne and State of Michigan, have invented certain new and useful Improvements in Handsaws, of which the following is a specification, reference being had therein to the accompanying drawings.

One of the objects of my invention is to furnish a saw handle with an adjustable blade that may be set at a desired angle relative to the saw handle, it being a well known fact that some users manipulate the saw either too much in a vertical direction or too much in a horizontal direction and by setting the saw blade such practice may be discouraged and the saw manipulated at a correct angle relative to a piece of material operated upon by the saw. By making the saw handle and blade adjustable relative to each other the saw may be properly balanced, and with the blade detachable it is obvious that the same handle can be used for a multiplicity of blades, thus permitting of one blade being sharpened while another blade is used with the original handle.

Another object of my invention is to adjustably connect the saw blade to a saw handle by means which will not interfere with the use of a saw in the usual manner and this and other objects are attained by a construction that will be hereinafter specifically described and then claimed.

Reference will now be had to the drawing, wherein—

Figure 1 is a longitudinal vertical sectional view of a saw handle and a portion of a blade attached to the handle in accordance with my invention;

Fig. 2 is a longitudinal transverse sectional view taken on the line II—II of Fig. 1, and Fig. 3 is a cross sectional view taken on the line III—III of Fig. 1.

In the drawing 1 denotes a saw handle having its outer edge provided with a groove 2, the full depth of said handle, and mounted in said groove by nut equipped screws 3, rivets or other fastening means is an angle frame 4 which abuts the body of the handle 1 and provides a fulcrum surface or edge 5 and a toothed member 6, said toothed member extending into an extension 7 of the groove 2, which groove extension is in the lower edge of the handle.

8 denotes an angularly disposed bore extending from the upper edge of the handle 1 and intersecting the groove 2. In said bore is an adjustable clamping member 9 provided with a slot 10 through which extends the frame 4, said clamping member being placed in the bore 8 and the frame 4 inserted through said clamping member before said frame is fixed to the saw handle. In the outer end of the clamping member 9 is a socket 11 having its walls screwthreaded to receive a screw 12, said screw having a knurled head 13 engaging the packing washer or seat member 14 set in the upper edge of the handle 1 and the open end of the bore 8.

15 denotes a portion of a saw blade having its inner end extending into the groove 2 of the handle 1 and said saw blade is cut away to provide clearance for portions of the frame 4 and also to provide a tongue 16 having a shoulder 17 and a fulcrum edge 18. The fulcrum edge 18 of the tongue 16 engages the fulcrum surface 5 of the frame 4 with the shouldered portion of the tongue extending into the slot 10 of the clamping member 9, so that said clamping member may be shifted outwardly by the screw 12 to engage the shoulder 17 of the tongue 16 and bind said tongue against the frame 4. The blade 15 is also cut away to afford a series of teeth and notches 19 within the groove extension 7 and adapted to be engaged by the toothed member 6 of the frame 4, the teeth or notches 19 being disposed in a plane approximately at a right angle to the backbone of the frame 4, so that when the clamping member 9 is loose relative to the tongue 16 the blade 15 may be shifted to permit of the toothed member 6 engaging in a desired notch of the saw blade. It is in this manner that the saw blade may be tilted relative to the handle 1 to change the action of the saw when being manipulated, and by drawing the clamping member 9 outwardly the tongue 16 can be clamped against the frame 4 to positively hold the notched portion of the blade 15 in engagement with the toothed member 6 of the frame 4. The tongue 16 may fulcrum on the frame while the blade is being changed relative to the handle and after the clamping member 9 is tightened the blade 15 will be firmly held in its adjusted position relative to the handle.

The advantage gained by my adjustable saw handle will be readily apparent to carpenters, cabinet makers and other artisans, and while in the drawing there is illustrated a preferred embodiment of my invention, it is to be understood that the construction is susceptible to such changes as fall within the scope of the appended claims.

What I claim is:—

1. A hand saw comprising a handle having a groove, a frame in the groove of said handle, a saw blade extending into the groove of said handle and engaging one end of said frame, and means adjustable in said handle and engaging said saw blade for adjusting said saw blade so as to tilt it relative to said handle.

2. A hand saw as called for in claim 1, wherein said frame and said saw blade extend into said means to permit of said means clamping said saw blade against said frame.

3. A hand saw comprising a handle, a frame mounted therein, a saw blade having a series of notches to receive an end of said frame, and a clamping member through which said frame extends and into which member said saw blade extends to be adjusted and held by said clamping member relative to said frame.

4. A hand saw as called for in claim 3, wherein said saw blade has a tongue providing a shoulder engaged by said clamping member and an edge engaged by said frame.

In testimony whereof I affix my signature in presence of two witnesses.

GEORGE FORTON.

Witnesses:
  KARL H. BUTLER,
  ANNA M. DORR.